(No Model.)  3 Sheets—Sheet 1.

F. W. MADER.
DICE BOX.

No. 470,498.  Patented Mar. 8, 1892.

Witnesses.
Chapman Fowler
Thomas Rout

Inventor:
Frederick W. Mader
by A. H. Evans & Co
Atty's.

(No Model.) 3 Sheets—Sheet 2.

F. W. MADER.
DICE BOX.

No. 470,498. Patented Mar. 8, 1892.

Witnesses:
Chapman Fowler
Thos. Rout

Inventor:
Frederick W. Mader
by— A. H. Evans & Co.
Attys.

(No Model.) 3 Sheets—Sheet 3.
F. W. MADER.
DICE BOX.

No. 470,498. Patented Mar. 8, 1892.

WITNESSES
Chapman Fowler
Thomas J. Royst

INVENTOR
Frederick W. Mader
by A. H. Evans & Co.
Attorneys

UNITED STATES PATENT OFFICE.

FREDERICK W. MADER, OF BUCYRUS, OHIO.

DICE-BOX.

SPECIFICATION forming part of Letters Patent No. 470,498, dated March 8, 1892.

Application filed October 9, 1891. Serial No. 408,269. (No model.)

*To all whom it may concern:*

Be it known that I, FREDERICK W. MADER, a citizen of the United States, residing at Bucyrus, in the county of Crawford and State of Ohio, have invented certain new and useful Improvements in Dice-Boxes, as set forth in the accompanying drawings, forming part of this specification, in which—

Figure 6:
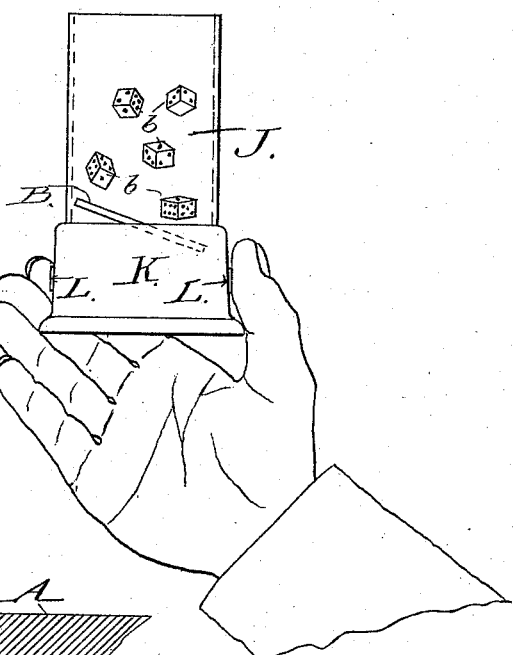
Figure 7:
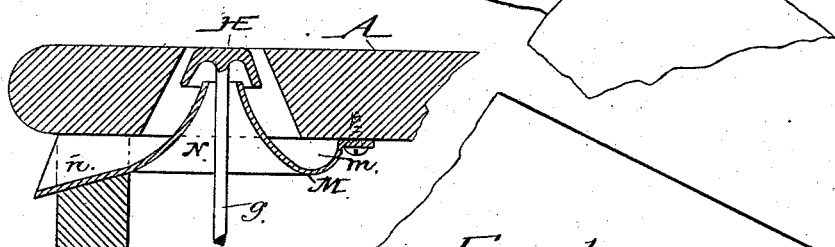
Figure 1:
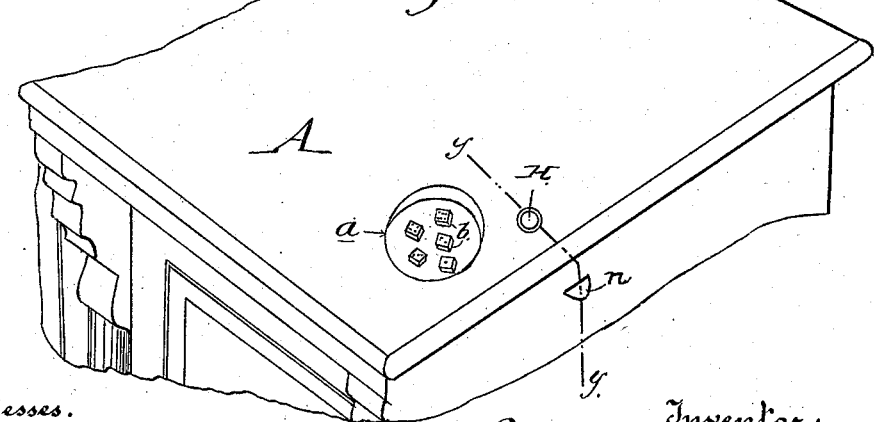
Figure 2:
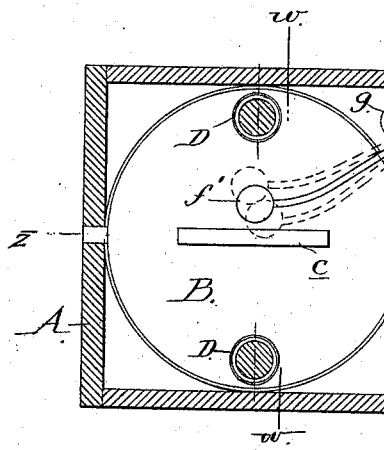
Figure 3:
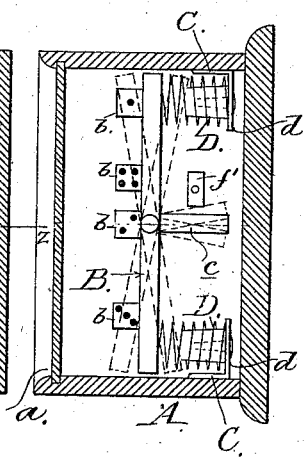
Figure 4:
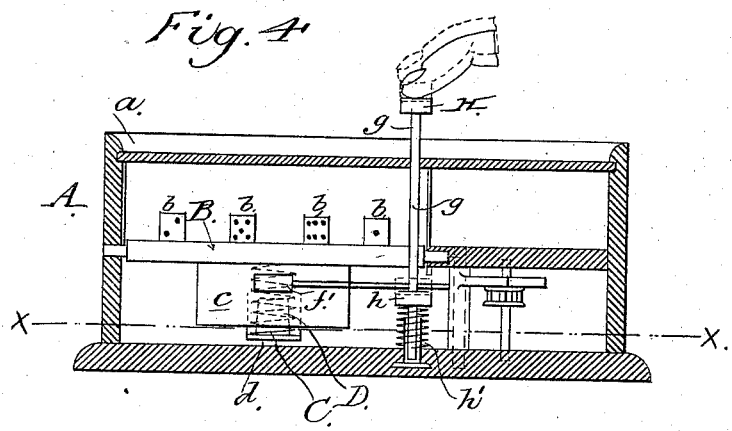
Figure 5:
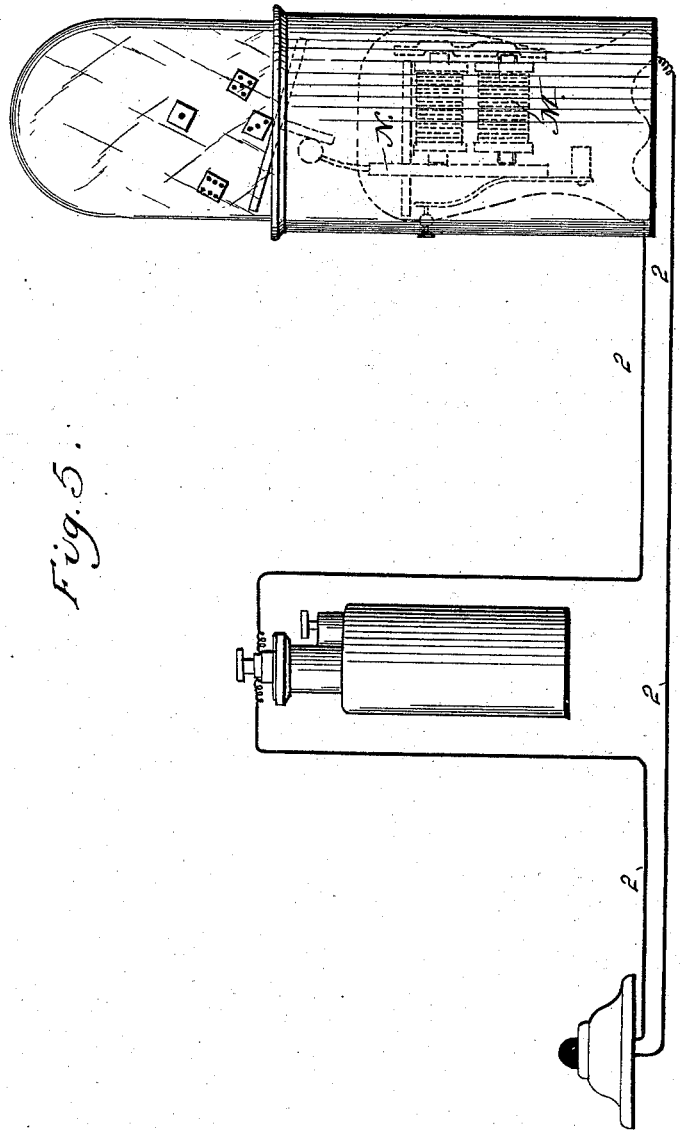

Figure 1 is a perspective view of a portion of a table with the dice-box let therein. Fig. 2 is a horizontal sectional view of the box on the line $x\ x$ of Fig. 4, showing the actuating mechanism. Fig. 3 is a cross-section on line $w\ w$ of Fig. 2. Fig. 4 is a longitudinal section on line $z\ z$ of Fig. 2. Fig. 5 is a modified form of dice-box, showing the application of electricity for oscillating the platform or bottom. Fig. 6 is a view of a box to be used in the hand. Fig. 7 is an enlarged section view on the line $y\ y$ of Fig. 1.

My invention relates to certain new and useful improvements in dice-boxes; and it consists, esentially, of a dice-box having a pivoted platform adapted to be oscillated by tripping a suitable mechanism, whereby the dice within the box are agitated, but allowed to settle upon the bottom when the actuating mechanism is stopped.

My invention also consists of the constructions and combination of devices, which I shall hereinafter fully describe and claim.

To enable others skilled in the art to which my invention appertains to make and use the same, I will now describe its construction and indicate the manner in which the same is carried out.

In the said drawings, A may represent a portion of a table, counter, or analogous article of furniture, or a box or casing formed with an opening whose upper portion $a$ is securely covered with glass or other transparent material and in whose lower portion is placed a pivotally-secured platform or bottom B, the said upper and lower portions $a$ and B forming an inclosed box, in which the dice $b$ are placed and confined. The platform or bottom B is centrally pivoted at opposite sides, and from its lower side projects an arm or lug $c$, against which a vibrating knocker or hammer operates to impart a rapid oscillating movement to the platform or bottom B and a corresponding agitation of the dice.

Contiguous to the under portion of the oscillating platform or bottom B, and in a plane at right angles to the axis thereof, are suitable brackets C, whose lower horizontal arms $d$ lie directly below the platform or bottom, and between said arms and the free sides of the platform or bottom are placed springs or buffers D, whose function will be hereinafter stated.

Various mechanisms may be employed to oscillate the platform or bottom. In Figs. 2, 3, and 4 I have shown one method for producing the desired effect, which includes clock mechanism of any well-known and approved form, having a pallet $e$ engaging the ratchet-wheel $f$ and provided with a stem whose lower end carries a hammer $f'$, which lies close to the arm of the oscillating platform or bottom and is designed to violently vibrate or oscillate the platform while the actuating mechanism is in motion.

In order that I may properly control the action of the clock mechanism, I have provided a stop or cut-off consisting of a push-button H, having a stem or rod $g$ extending inward through the frame of the clock-work and provided with a collar or shoulder $h$, which lies against the stem of the actuating-pallet to hold the latter against movement, but to allow the pallet to operate when the push-button is pressed inward to release the collar or shoulder from contact with the arm or stem of the pallet.

In order that the push-button may be returned to its normal position after being depressed, I have connected the stem of the push-button with a spring $h'$, which when the pressure on the button is released projects the button outward and forces the collar or shoulder on the stem of the push-button behind the stem of the pallet, and thereby prevents further movement of the hammer against the arm of the platform or bottom of the box.

While the hammer is in motion it strikes the arm of the platform or bottom B with short quick strokes, the motion thus imparted to the latter being resisted by the buffers or springs at the free ends of the platform or bottom. The vibratory motion thus given the platform or bottom is communicated to the dice resting upon it and causes a violent agitation of them, which is maintained until the actuating mechanism ceases to operate, as before described.

In Fig. 6 I illustrate a dice-box to be used in the hand and in which the dice are contained in a glass or other frame J, and the actuating mechanism is hid within a lower case K, through the sides of which the push-buttons L protrude, so that they may be operated by the fingers. The oscillations of the platform or bottom may also be accomplished by means of electricity, as shown in Fig. 5, in which case the core of an electro-magnet M, located within a case below the platform or bottom, attracts an armature N, connected with or carrying the hammer which operates the platform or bottom. In this latter case the push-button is connected with the wires 2 2, leading from a battery of any well-known form, and the connections made in the manner common to the well-known make and break circuits now in use.

From the description given it will be manifest that when the push-button is pressed it starts in motion the vibrating hammer, which, operating against the arm of the pivoted platform or bottom, causes a rapid oscillation of the same and a corresponding agitation of the dice, which latter, being confined within a closed compartment, are thrown upward against the glass top and sides of the compartment or box and afterward allowed to settle upon the platform or bottom, where their numbers may be observed through the glass top.

In Fig. 7 the push-button is shown as being mounted in an opening in the counter or table, so that it lies flush with its outer surface, and to the lower side of the table is secured a plate M, having an inverted-cone-shaped portion N, through which the stem $g$ of the push-button passes, said plate having a gutter or trough $m$, with a discharge-spout $n$ to carry off any dirt or liquid which may fall upon the counter or table and tend to make the push-button stick or work hard.

Having thus described my invention, what I claim as new, and desire to secure by Letters Patent, is—

1. A dice-box comprising an inclosure for the dice, a horizontal platform pivotally secured at its center and forming the bottom of the inclosure, a vibrating hammer adapted to operate the platform to oscillate the same, and means for actuating the hammer, substantially as herein described.

2. A dice-box having an inclosed chamber for the dice and provided with a pivotally-secured platform upon which the dice rest, in combination with a push-button, a vibrating hammer or knocker, and intermediate mechanism actuated by the movement of the push-button to release the hammer, whereby the platform is oscillated.

3. A dice-box consisting of an inclosed chamber having a transparent upper portion and provided with a pivotally-secured horizontal platform in its lower portion, clock mechanism, including a pallet having a stem provided with a hammer adapted to engage the platform or bottom to oscillate the same, a push-button having a stem provided with a collar or shoulder adapted to control the movement of the pallet, and cushions or springs resisting the oscillations of the platform or bottom, substantially as herein described.

4. A dice-box comprising an inclosed chamber for the dice, a horizontal pivotally-secured bottom or platform, a vibrating hammer adapted to operate against the platform or bottom, a push-button, and intermediate mechanism for releasing the hammer, and cushions or springs for resisting the oscillations of the platform, substantially as herein described.

5. In a dice-box, the inclosing chamber, the pivotally-secured platform, and a knocker for actuating the same, in combination with a push-button mounted in a support for the box, and a plate M, secured under the push-button and having a conical portion N, through which the stem of the push-button passes, said plate having also a trough provided with a discharge-spout, substantially as herein described.

FREDERICK W. MADER.

Witnesses:
S. R. HARRIS,
PETER HUNSICKER.